(12) United States Patent
LaVancher

(10) Patent No.: US 10,619,341 B2
(45) Date of Patent: Apr. 14, 2020

(54) WASTEWATER LIFT STATION VENT ODOR NEUTRALIZATION DEVICE

(71) Applicant: Heyward Florida Inc., Winter Park, FL (US)

(72) Inventor: Rodney L. LaVancher, Winter Park, FL (US)

(73) Assignee: Heyward Florida Inc., Winter Park, FL (US)

( * ) Notice: Subject to any disclaimer, the term of this patent is extended or adjusted under 35 U.S.C. 154(b) by 236 days.

(21) Appl. No.: 15/958,558

(22) Filed: Apr. 20, 2018

(65) Prior Publication Data

US 2018/0305917 A1    Oct. 25, 2018

Related U.S. Application Data

(60) Provisional application No. 62/487,901, filed on Apr. 20, 2017.

(51) Int. Cl.
| | | |
|---|---|---|
| *B01D 53/14* | (2006.01) | |
| *E03F 5/22* | (2006.01) | |
| *E03F 5/042* | (2006.01) | |
| *E03F 5/18* | (2006.01) | |
| *E03F 5/08* | (2006.01) | |
| *F04D 13/16* | (2006.01) | |
| *B01D 21/00* | (2006.01) | |

(52) U.S. Cl.
CPC .............. *E03F 5/22* (2013.01); *B01D 53/14* (2013.01); *E03F 5/042* (2013.01); *E03F 5/08* (2013.01); *E03F 5/18* (2013.01); *B01D 21/0042* (2013.01); *B01D 2253/102* (2013.01); *F04D 13/16* (2013.01)

(58) Field of Classification Search
CPC .......... B01D 21/0042; B01D 2253/102; B01D 47/02; B01D 47/024; B01D 53/14; E03F 5/042; E03F 5/08; E03F 5/18; E03F 5/22; F04D 13/16
USPC ........................... 96/108, 152, 262, 278, 329
See application file for complete search history.

(56) References Cited

U.S. PATENT DOCUMENTS

| | | | | |
|---|---|---|---|---|
| 1,492,616 | A * | 5/1924 | White ................. | F02M 35/026 96/278 |
| 2,480,379 | A * | 8/1949 | Newberry ............. | F02M 35/02 55/447 |
| 3,350,322 | A * | 10/1967 | Waterhouse ......... | F02M 35/026 96/242 |
| 4,689,057 | A * | 8/1987 | Gasper ................. | B01D 53/261 55/385.1 |
| 4,694,267 | A * | 9/1987 | Guill ........................ | H01P 1/30 333/248 |
| 6,217,639 | B1 * | 4/2001 | Jackson ............. | B01D 53/0415 55/385.4 |

(Continued)

*Primary Examiner* — Frank M Lawrence, Jr.
(74) *Attorney, Agent, or Firm* — McHale & Slavin, P.A.

(57) ABSTRACT

An odor neutralization device for a wastewater lift station wastewater vent. The device is formed from a housing having a vertical standpipe with a first end securable to the receiver vent of a wastewater lift station and a second end extending above an admixture of essential oils and a surfactant. A baffle arrangement increases the velocity of air exiting or entering the wastewater lift station. The accelerated air is directed across the surface of the admixture for altering the characteristics of any odor laden air.

12 Claims, 4 Drawing Sheets

(56) References Cited

U.S. PATENT DOCUMENTS

2004/0255779 A1* 12/2004 Trivett .................. B01D 47/06
                                                                             95/226

* cited by examiner

WASTEWATER LIFT STATION VENT ODOR NEUTRALIZATION DEVICE

PRIORITY CLAIM

In accordance with 37 C.F.R. 1.76, a claim of priority is included in an Application Data Sheet filed concurrently herewith. Accordingly, the present invention claims priority to U.S. Provisional Patent Application No. 62/487,901, entitled "WASTEWATER LIFT STATION VENT ODOR NEUTRALIZATION DEVICE", having a filing date of Apr. 20, 2017, the contents of which are incorporated herein by reference.

FIELD OF THE INVENTION

The field of the invention is wastewater treatment; namely, an odor neutralization device for placement on the vent for a wastewater lift station.

BACKGROUND OF THE INVENTION

Wastewater lift stations, also referred to as pumping stations, are facilities employed by municipalities to transfer wastewater. In a conventional system, transfer of wastewater is from a lower elevation to a higher elevation, wherein gravity allows further wastewater fluid flow. However, in certain instances, the elevation of the source is not sufficient to gravity flow, and a lift station essentially operates as a transfer station.

Lift stations are used to reduce the capital cost of sewer system construction. The lift stations allow the municipality to avoid digging deep trenches, so as to allow gravity flow. Deep trenches are expensive to install, mainly due to the costly excavation and trench wall shoring issues. Further, lift stations allow use of a reduced pipeline size, wherein pump transfer provides an adjustable and sustainable pipeline flow rate.

The main elements of a lift station are the wastewater receiving well and the associated pump. The wastewater receiving well receives waste from one source, where it is held temporarily for transfer to another location by use of the pump. The receiving well requires a ventilation system, so as to allow the displacement of air during the filling of the receiving well, as well as incoming air required during the emptying of the receiving well. During operation, the wastewater contains certain bacteria that grow and mutate, resulting in odors that can be quantified as slight to outright annoying. For this reason, a vent is placed on the receiving well, so as to treat the displaced air while the receiving well is being filled, and allow air intake into the receiving well while it is being emptied.

The odor emanating from the receiving well is commonly treated by the use of an activated carbon vent, which is known to absorb unpleasant odors and gases using activated carbon material. The activated carbon material consists of a specially treated charcoal that has been oxygenated at a high pressure to create hundreds of thousands of pores on the surface. In this manner, the activated carbon acts like a sponge to absorb peculiar gases and odors. The longevity of the activated carbon is dependent upon the pores that are being filled with the objectionable matter. Once filled, the activated carbon can either be disposed of, or re-fired for additional activation. Unfortunately, the cost of the activated carbon can be expensive, and the exchanging of the activated carbon is not necessarily a pleasant task.

Air scrubbers are known in the industry for removing odors using a liquid to wash unwanted pollutants from a gas stream. However, such devices are costly, require close maintenance and consume a large footprint, making them an unsightly addition to a lift station, especially those found in residential areas.

Thus, what is needed in the industry is a passive venting device that requires a small footprint and is capable of replacing foul odors expelled from a wastewater receiver lift station with a pleasant scent.

SUMMARY OF THE INVENTION

Disclosed is a device that attaches to the vent pipe of a conventional wastewater lift station. The device includes a standpipe that extends into a housing for accelerating ventilated air across the surface of an admixture containing essential oils and a surfactant. The spacing between the standpipe and the baffle is arranged to cause an acceleration of the air expelled from the wastewater receiver, so as to maximize contact with the admixture. The admixture of essential oils and surfactant absorbs odors by working through an exchange process and releasing a fragrance, thereby exhausting a pleasantly surprising scent from the housing. The housing includes an overflow drain should the container be breached with excess condensate or rainwater; the overflow drain directing fluid directly into the wastewater reservoir. A drain valve is further attached to the housing for draining the admixture and allowing for ease of replenishment. A lid on the housing is easily removed so that the admixture can be refilled and the contents of the housing checked.

An objective of the invention is to disclose a passive venting device for use with a wastewater receiver that is inexpensive to manufacture, inexpensive to maintain, and effectively controls wastewater odors with no moving parts.

Yet another objective of the instant invention is to disclose a venting device having an internal configuration so as to increase the velocity of the vented air and direct the accelerated air past an admixture capable of treating the odors carried by the vented air.

Still another objective of the instant invention is to provide a venting device having strategically positioned side wall vents capable of handling accelerated vented air from the wastewater receiver.

Still another objective of the instant invention is to disclose a venting device having an admixture capable of treating wastewater odors when odor laden air is drawn across a surface of the admixture.

Still another objective of the instant invention is to disclose a venting device having an overflow drain capable of moving excess water contained within the housing directly to the wastewater receiver.

Still another objective of the instant invention is to provide a drain and manual valve assembly to allow simplicity in cleaning of the housing when the admixture used for treating of odors must be exchanged.

Yet still another objective of the instant invention is to provide a passive wastewater receiver vent device that eliminates the need for activated carbon used for absorption of odors, or the need for air scrubbers.

Other objectives and further advantages and benefits associated with this invention will be apparent to those skilled in the art from the description, examples and claims which follow.

DETAILED DESCRIPTION OF THE INVENTION

Figure 1:
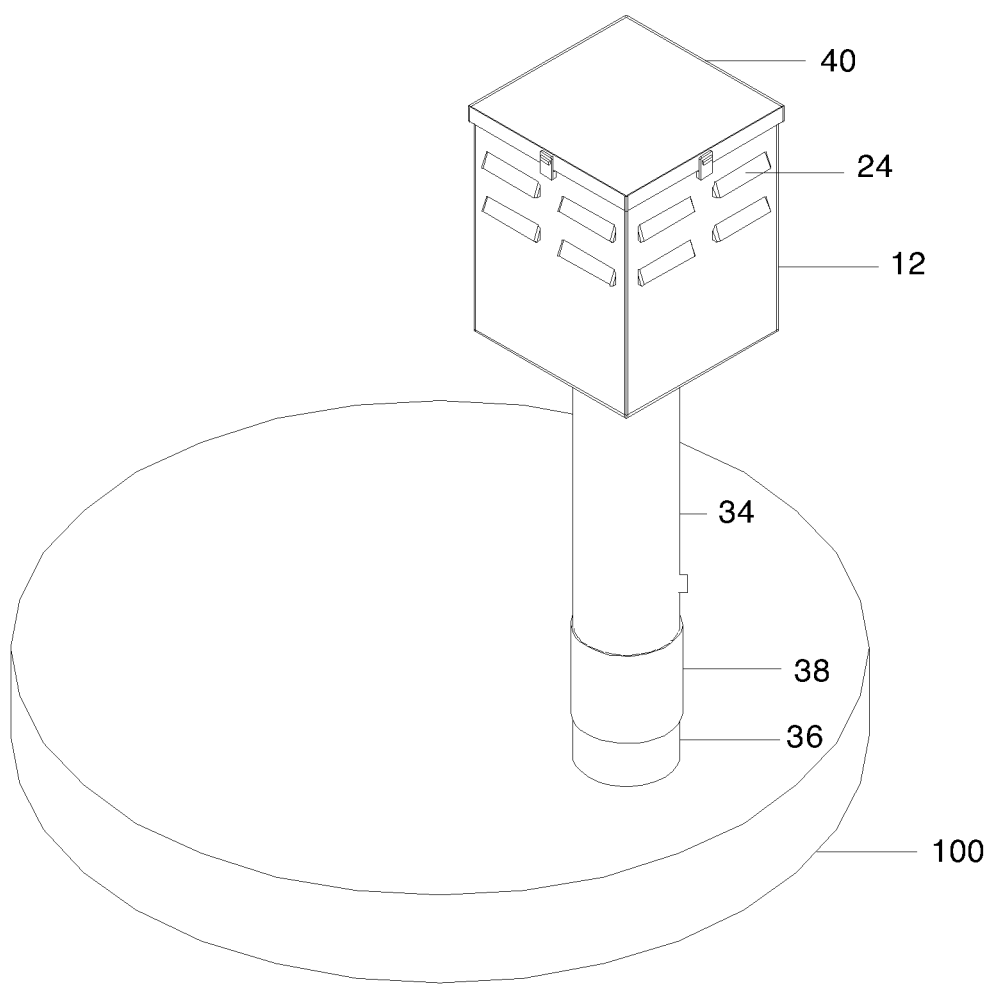
FIG. 1 is a perspective view of the wastewater receiver lift station vent of the instant invention.
Figure 2:
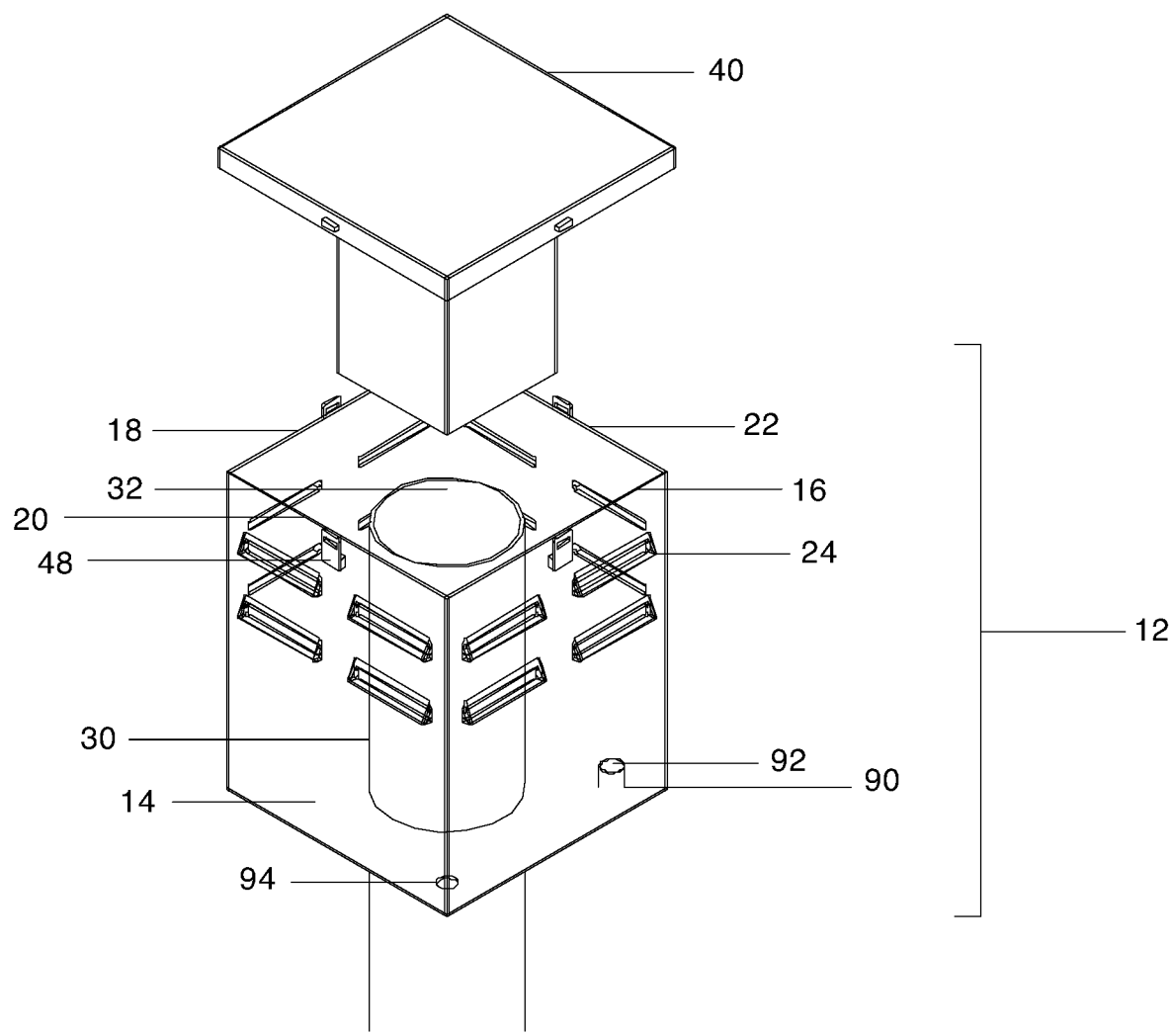
FIG. 2 is an exploded view of the lift station vent.
Figure 3:
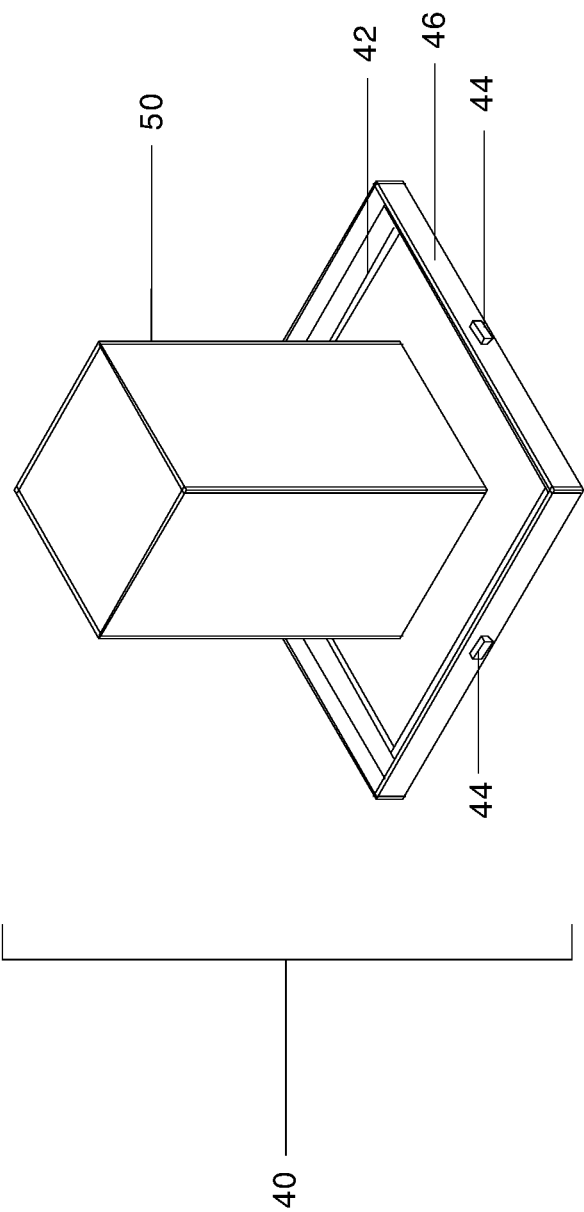
FIG. 3 is a perspective view of the lid placed upside down.

Detailed embodiments of the instant invention are disclosed herein; however, it is to be understood that the disclosed embodiments are merely exemplary of the invention, which may be embodied in various forms. Therefore, specific functional and structural details disclosed herein are not to be interpreted as limiting, but merely as a basis for the claims and as a representation basis for teaching one skilled in the art to variously employ the present invention in virtually any appropriately detailed structure.

Now referring to the drawings in general, disclosed is a vent device 10 for use with a wastewater receiver lift station. The vent device 10 consists of a housing 12 having a floor that provides a bottom support surface 14, a front wall 16, a rear wall 18, a left wall 20 and a right wall 22. Each of the walls, 16, 18, 20, 22, includes vent apertures 24 which are large enough to expel air without restriction. The vent apertures 24 preferably include louvers, or the like shape, to prevent rain from entering the housing, and may include a grill to inhibit small animals and reptiles from entering. The vent device 10 includes a vertical standpipe 30 which extends a pre-determined distance above the bottom support surface 14. The standpipe 30 has an inner wall 32 forming a flow through aperture which is coupled to, or formed integral therewith, a base pipe 34 for securement to a wastewater receiver vent pipe 36 by a conventional Fernco fitting 38.

The housing 12 is enclosed by a lid 40 securable to the walls 16, 18, 20 and 22. The lid 40 has a gasket 42 which provides a seal against the walls to force all venting through the apertures 24. The lid 40 is secured by the use of latch receptacles 44 located along the outer edge 46 of the lid for use with a latch mechanism 48 located on each of the walls of the housing. The latch mechanism 48 allows for ease of access to the interior of the housing by a simple release of the latch clips and lifting of the lid 40, revealing the inside walls of the housing, including the bottom support surface 14. The lid includes a baffle 50, which is constructed and arranged to fit around the outer diameter of the standpipe 30. Depicted is a substantially square baffle 50, although a circular or any other shape of baffle could be employed. The objective of the baffle 50 is to form a space between the inner surface 49 of the baffle 50 and an outer surface 51 of the standpipe 30.

Figure 4:
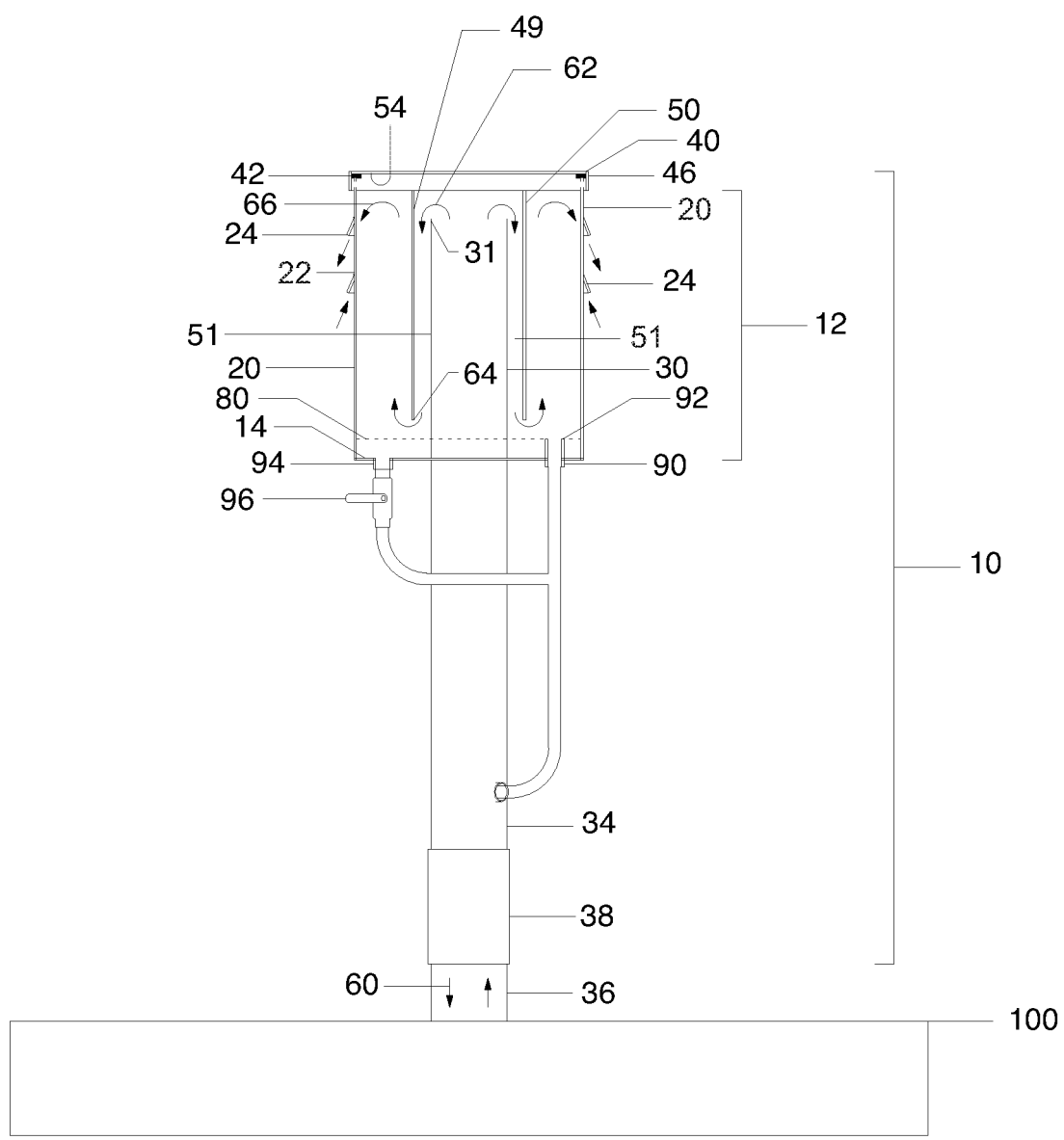
FIG. 4 is a cross sectional side view of the lift station vent.

Referring to FIG. 4, disclosed is a cross sectional view of the housing 12 with the lid 40 attached to the top of the walls 20, 22 of the housing 12. The lid 40 baffle 50 extends from an inner surface 54 of the lid 40 to a distance spaced above the bottom support surface 14. A distal end 31 of the standpipe 30 extends within the baffle 50, where air ventilated from the wastewater reservoir 100 is vented upward through the vent pipe 36, as depicted by arrows 60, and into the baffle 50, where it is forced downward 62 beneath the baffle edge 64, allowing the air to escape through vent apertures 24, as depicted by arrows 66. The bottom support surface 14 holds an admixture 80 consisting of a proprietary formulation of essential oils and a surfactant. The standpipe 30 positioned within the baffle 50 has a height above the bottom support surface 14 so as to cause the air being expelled from the wastewater receiver 100 to follow a path, causing a reverse flow to be pushed downward between the standpipe and baffle, wherein the air flow is accelerated and forced against the admixture 80. Contact with the admixture 80 causes odor laden air to have certain particles pulled into the admixture, and a release of a scented fragrance expelled through apertures 24, as depicted by vent arrows 66.

An overflow drain pipe 90 having a distal end 92 is positioned above the surface of the admixture 80 and used to divert excess fluid from within the housing. Should the fluid in the housing be raised above the distal end 92, the overflow fluid will drain into the vent pipe 36 for deposit in the wastewater reservoir 100. The overflow drain pipe distal end 92 remains open at all times so as to prevent the admixture from filling up the housing and escaping through the vents 24 due to abnormal events, such as blowing rain or excess condensation. A floor drain 94 is positioned flush with the bottom support surface 14, and utilizes a manual valve 96 to initiate the removal of the admixture from the housing by opening up the valve 96 for drainage directly into the wastewater receiver 100. It has been found that the admixture is most effective if maintained no more than three months, which accommodates most conditions, including evaporation. Proposed scheduling would recommend admixture change every three months, wherein discarded admixture is drained into the wastewater receiver by use of the control valve 96.

Refilling of the bottom support surface 14 is performed by removal of the lid 40 by detachment of the latches and 48. When the lid 40 is unlatched and lifted from the housing, replacement admixture is pooled over the bottom support surface 14. Unique to the device is that no further maintenance is required, and there are no moving parts to be serviced within the passive vent device.

The main objective of the invention is to cause as much ventilated air as possible to be directed past the admixture 80, wherein the spacing between the standpipe 30 and the baffle 50 is critical, both in length and in width. The flow will minimize restrictions, but maximize the velocity across the surface of the admixture 80 during the venting process. It should be noted that, while the level of the wastewater receiver varies, fluid displacement requires a displaced volume to be filled with air. The venting device 10 treats air incoming to the wastewater receiver 100, as well as air being expelled from the wastewater receiver. This further reduces odors by not only treating those odors that are expelled from the wastewater receiver, but also treating those odors contained within the wastewater receiver. Changing the admixture approximately every three months is suitable in most instances; spoiled admixture can be drained into the wastewater receiver to help control odors within the receiver itself. The illustrated standpipe 30 is square shaped; however, a rectangular shape or circular shape may also be used. The shape or diameter of the standpipe should be equal to or larger than the diameter of a vent pipe.

It will be apparent to those skilled in the art that various changes may be made without departing from the scope of the invention, and the invention is not to be considered limited to what is shown and described in the specification and any drawings/figures included herein. One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary, and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. An odor neutralization device for a wastewater lift station vent comprising:
    a vertical standpipe having an end securable to a wastewater lift station vent pipe and a distal second end extending a distance above the lift station, said vertical standpipe having a diameter;
    a housing securable to said second end of said vertical standpipe, said housing having a bottom support surface attached to a front wall, a rear wall and two opposing side walls forming an interior, at least one of said walls having vent apertures constructed and arranged to allow air passage, said second end of said vertical standpipe extending through said bottom support surface a predetermined distance into the interior of said housing;
    an admixture covering an inner surface of said bottom support surface;
    a lid releasably secured to said housing, said lid having a baffle extending a second predetermined distance from an inner surface of said lid, said baffle having a diameter greater than said standpipe diameter;
    wherein odor laden air received from said wastewater lift station vent pipe flows through said standpipe and is accelerated within the space formed between said standpipe and said baffle directing the odor laden air across the surface of said admixture before expulsion through said vent apertures, whereby said admixture alters the characteristics of the odor laden air.

2. The odor neutralization device according to claim 1, wherein said baffle is constructed and arranged to direct the flow of odor laden air in a substantially transverse direction across the surface of said admixture.

3. The odor neutralization device according to claim 1, wherein said admixture contains a mixture of essential oils.

4. The odor neutralization device according to claim 3, wherein said admixture includes a surfactant.

5. The odor neutralization device according to claim 1, wherein said lid is releasably secured to said housing with latches, wherein said lid is removable for placement of the admixture over the bottom support surface.

6. The odor neutralization device according to claim 1 including an overfill drain positioned at a predetermined distance above the bottom surface, wherein said overfill drain is fluidly coupled to a wastewater receiver for draining fluid that exceeds a predetermined level above the bottom surface.

7. The odor neutralization device according to claim 1 including a drain positioned along the bottom surface, wherein said drain is fluidly coupled to a wastewater receiver for draining expired admixture.

8. The odor neutralization device according to claim 1 wherein said standpipe has a circular diameter that equals the diameter of a vent pipe.

9. The odor neutralization device according to claim 1, wherein said baffle is substantially square shaped and constructed and arranged to be greater than said standpipe diameter to promote an acceleration of odor laden air between said baffle and said standpipe.

10. The odor neutralization device according to claim 1, wherein said baffle has a circular diameter and is constructed and arranged to be greater than said standpipe diameter to promote an acceleration of odor laden air between said baffle and said standpipe.

11. The odor neutralization device according to claim 1, including an overflow drain positioned between said bottom support surface and said standpipe, wherein fluid exceeding a predetermined level on said bottom support surface will drain into said standpipe for return to the lift station.

12. The odor neutralization device according to claim 1, including a drain positioned between said bottom support surface and said standpipe, said drain including a valve, wherein said admixture placed on said bottom support surface can be drained into said standpipe.

* * * * *